United States Patent [19]

Nakai et al.

[11] 4,269,333

[45] May 26, 1981

[54] PINCH VALVE FOR A CLOSED CONTAINER

[75] Inventors: Kiyoshi Nakai, Fujieda; Hidenobu Miyajima, Fukuroi; Syuji Harada, Kakegawa, all of Japan

[73] Assignees: Asahi Malleablt Iron, Co., Ltd.; Nippon Light Metal Co., Ltd., both of Tokyo, Japan

[21] Appl. No.: 929,460

[22] Filed: Jul. 31, 1978

[30] Foreign Application Priority Data

Aug. 8, 1977 [JP] Japan .................. 52-105940[U]
Aug. 12, 1977 [JP] Japan .................. 52-96097
Aug. 12, 1977 [JP] Japan .................. 52-107120[U]
Aug. 12, 1977 [JP] Japan .................. 52-107121[U]

[51] Int. Cl.³ .............................................. B67D 3/00
[52] U.S. Cl. ................................. 222/484; 137/588; 222/506; 251/9
[58] Field of Search ............... 222/210, 211, 212, 213, 222/214, 215, 483, 484, 103, 188, 181, 185, 505, 511, 529, 531, 537, 482, 506; 251/6, 7, 9, 10; 137/587, 588; 128/214 R, 214 C, 214.2, 227

[56] References Cited

U.S. PATENT DOCUMENTS

| 1,190,586 | 7/1916 | Robertson | 222/482 X |
| 2,164,965 | 7/1939 | Traube | 222/529 X |
| 2,985,192 | 5/1961 | Taylor et al. | 251/7 X |
| 3,216,418 | 11/1965 | Scislowicz | 128/214 C |
| 3,227,315 | 1/1966 | Wain | 222/452 X |
| 3,411,534 | 11/1968 | Rose | 251/9 X |
| 3,648,701 | 3/1972 | Botts | 251/6 X |
| 3,995,774 | 12/1976 | Cooprider | 222/214 X |
| 4,061,142 | 12/1977 | Tuttle | 251/9 X |

Primary Examiner—David A. Scherbel
Assistant Examiner—Fred A. Silverberg
Attorney, Agent, or Firm—Oblon, Fisher, Spivak, McClelland & Maier

[57] ABSTRACT

A normally closed container containing liquid therein and having a single pinch valve secured thereto. The pinch valve releasably clamps a portion of a resilient liquid discharge tube and also releasably clamps a portion of a resilient inlet tube which introduces air into the container in discharging liquid out of the container. The timing of opening and closing of two tubes with respect to operation of the pinch valve is determined as desired.

5 Claims, 11 Drawing Figures

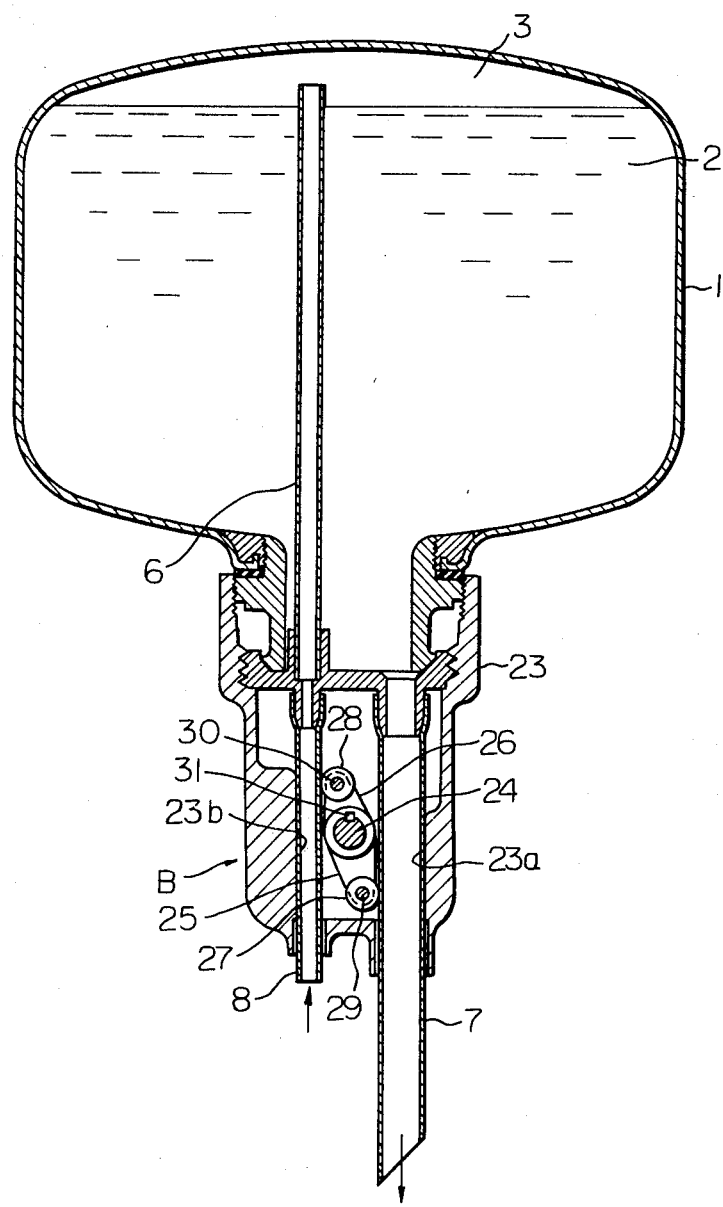

PINCH VALVE FOR A CLOSED CONTAINER

BACKGROUND OF THE INVENTION

This invention relates to a closed container for containing liquid therein and dispensing it as desired. The liquid may be of any kind including carbonated beverage such as beer, soda water or the like, other beverages such as fruit juice or the like, and food oil, soy sauce or the like, and other liquid such as voratile liquid such as perfume or the like.

Conventional liquid storing containers of aforementioned liquids include a liquid discharge port and also an air inlet port, and the air inlet port is formed to communicate with atmosphere permanently or to open every time when liquid in the container is discharged. However, it is troublesome and inconvenient to open the air inlet port every time when liquid is discharged, and if the air inlet port is maintained to permanently communicate with atmosphere, liquid in the container is permanently exposed to atmospheric air thereby deteriorating quality of the liquid such as taste or color.

Particularly, carbonated beverages such as draft beer or the like will deteriorate very soon since flavor and quality will deteriorate within a relatively short period of time when the liquid in the container is communicated with atmosphere, thus, it is desired to open the air inlet port only when the liquid is discharged, particularly when the liquid is draft beer.

SUMMARY OF THE INVENTION

An object of the invention is to prevent shortcomings aforementioned and, according to the invention there is provided a closed container containing liquid therein and having a pinch valve for opening and closing the liquid discharge port and also opening and closing the air inlet port in connection with opening and closing of the liquid discharge port, thereby simplifying operation of the valve, and preventing deterioration of the quality of liquid contained in the container.

Since the device of the present invention can be used with ease in dispensing beer contained in the container by a simple manipulation thereof at the time desired for dispensing beer from the container so as to automatically open and close the communicating tube in coupled relationship with the opening and closing of the dishcarge tube, and, since the air communicating tube extends through beer in the container into the space above the level of beer in the container, air introduced into the container through the inlet tube and the communicating tube will not flow in bubbled condition through the mass of beer. Therefore, the contact of air with beer which causes deterioration of the quality of beer is reduced to the minimum.

Further, contrary to the prior art valve for dispensing beer from a container which tends to cause turbulent flow of beer thereby generating bubbles and causing deterioration of the quality of beer, the pinch valve of the present invention will not cause turbulent flow of beer thereby permitting beer to be dispensed with little bubbling. The time difference between the opening and closing of the discharge tube and the inlet tube insures superior effectiveness for maintaining the quality of beer in the container in the best condition.

BRIEF DESCRIPTION OF THE ACCOMPANYING DRAWINGS:

Other objects and advantages of the invention will become apparent to those skilled in the art from the following description taken in connection with the accompanying drawings exemplifying some preferred embodiments of the invention, in which:

FIG. 6 is a view similar to FIG. 5 with the pinch valve thereof being in fully opened condition;

DETAILED DESCRIPTION OF THE PREFERRED EMBODIMENT

Figure 1:
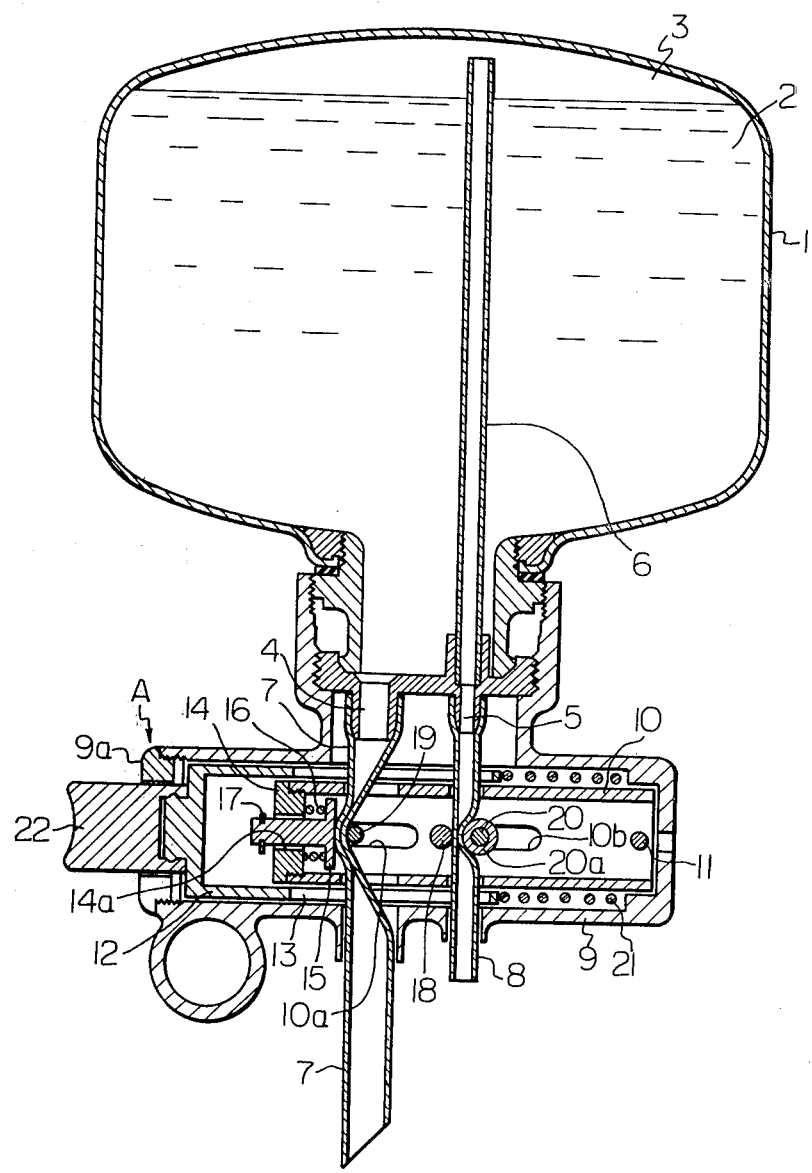
FIG. 1 is a longitudinal sectional view of a closed container according to the invention and showing a pinch valve thereof being in fully closed condition.

In the drawings, shown at 1 is a closed container receiving liquid 2 such as draft beer, fruit juice or the like, at 3 an air space defined in the upper portion in the container 1, at 4 a liquid discharge port formed in the lower portion of the container 1, at 5 an air inlet port formed in the lower portion of the container 1, and at 6 is an air communicating tube connecting the air inlet port 5 with the air space 3.

According to the invention a resilient discharge tube 7 formed of rubber or the like is connected to the discharge port 4, and a resilient air inlet tube 8 formed of rubber or the like is connected to the inlet port 5 and is disposed adjacent to the discharge tube 7, and the resilient tubes 7 and 8 are associatingly opened and closed by a pinch valve.

The pinch valve according to a first embodiment of the invention is generally designated at A in FIGS. 1–4 inclusive, and comprises a casing 9 connected to the lower portion of the container 1, a stationary cylindrical member 10 secured to the casing 9 by a pin 11 and disposed in the casing 9, a movable cylindrical member 12 fitted on the stationary member 10 and being slidable thereon. Two resilient tubes 7 and 8 pass transversely through the casing 9, the stationary cylindrical member 10 and the movable cylindrical member 12. There is formed elongated openings 13 in the movable member 12 to receive the resilient tubes 7 and 8 therethrough. A cap 14 having a central opening 14a is secured to one end of the stationary member 10. A supporting element 15 having a head portion and a stem portion as shown in the drawing is mounted on the cap 14 and is slidable relative thereto by a predetermined amount with the stem portion being fitted in the central opening 14a. A spring 16 is interposed between the head portion of the supporting element 15 and the cap 14, and a snap ring 17 is fitted on the projecting end of the stem portion of the element 15. The supporting element 15 engages with one side surface of the resilient tube 7.

Figure 2:
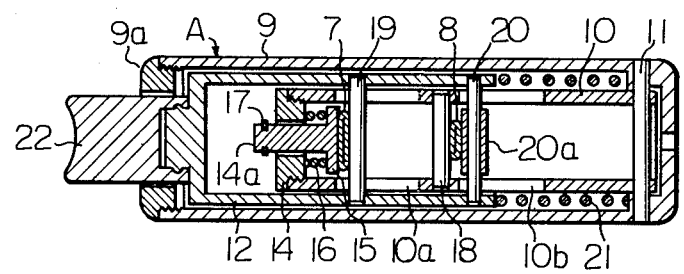
FIG. 2 is a cross-sectional view of the pinch valve of FIG. 1.

A rod-like shaped supporting element 18 for engaging with one side surface of the resilient tube 8 is mounted on the stationary member 10 with the opposite ends thereof being secured to the member 10 as shown clearly in FIG. 2. Two rod-like shaped pressing elements 19 and 20 are provided on the movable member 12 with the opposite ends thereof being secured to the member 12 respectively for engaging with the other side surfaces of the tubes 7 and 8 respectively. A sleeve 20a is fitted on the pressing element 20 in the embodiment. There is formed elongated openings 10a and 10b in the stationary member 10 for allowing movement of the pressing elements 19 and 20 accompanied by movement of the movable member 12 with respect to the stationary member 10.

A spring 21 is interposed between the casing 9 and the movable member 12 to urge the pinch valve in its fully closed position as shown in FIG. 1. A push button or an operating knob 22 is integrally connected to the movable member 12 and projects out of the casing 9 through an end cap 9a thereof.

Figure 5:
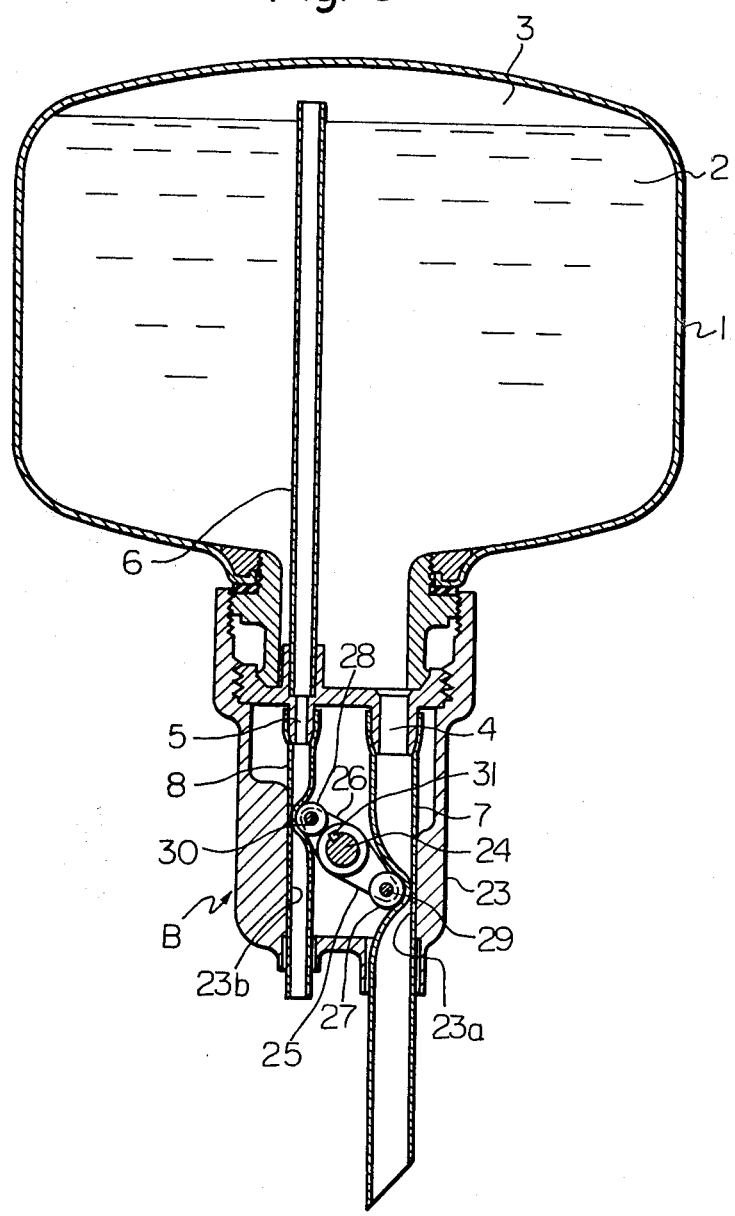
FIG. 5 is a longitudinal sectional view of a second embodiment of the present invention.

FIGS. 5 and 6 show a second embodiment of the present invention wherein the pinch valve is generally designated at B. The pinch valve B comprises a casing 23 connected to the lower end portion of the container 1, and through which the resilient tubes 7 and 8 pass. A shaft 24 is rotatably mounted on the casing 23 and extends through a space defined between the tubes 7 and 8. Arms 25 and 26 are provided to project diametrically opposite directions from the shaft 24, and rollers 27 and 28 acting as pressing elements or cams are rotatably mounted on the arms 25 and 26 respectively by pins 29 and 30, whereby the rollers 27 and 28 press the resilient tubes 7 and 8 against inner walls 23a and 23b of the casing 23 or release them so as to close or open the discharge and inlet port 4 and 5 upon rotation of the shaft 24. Shown at 31 in the drawings is a key.

Figure 7:
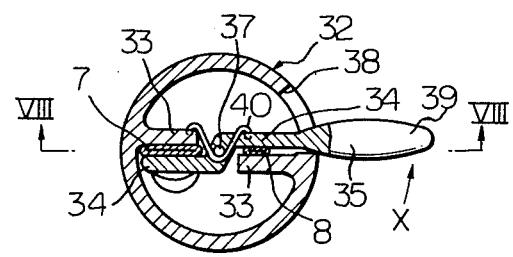
FIG. 7 is a cross-sectional view of a third embodiment of the invention showing the pinch valve thereof being in fully closed condition.
Figure 8:
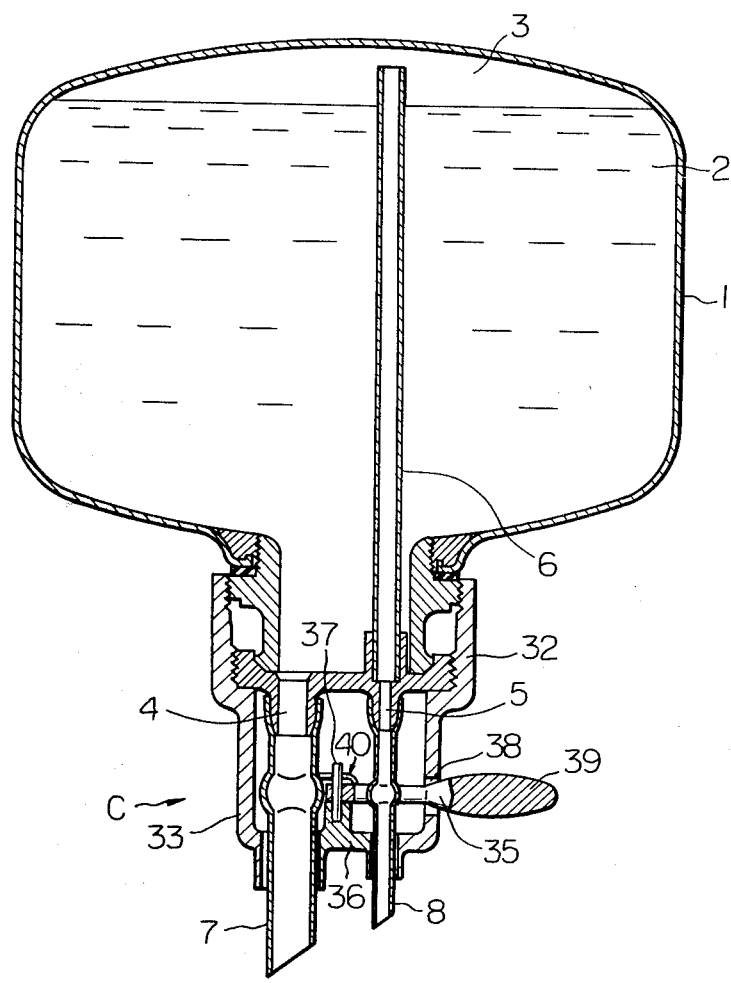
FIG. 8 is a longitudinal sectional view taken generally along line VIII—VIII in FIG. 7 with the pinch being in fully opened condition.

FIGS. 7 and 8 show a third embodiment of the present invention wherein the pinch valve is generally designated at C. The pinch valve comprises a casing 32 connected to the lower portion of the container 1 and through which the resilient tubes 7 and 8 pass. There is provided walls 33 and 33 in the casing 32 which cooperate with pressing portions 34 and 34 of a pressing lever 35 so as to releasably clamp the resilient tubes 7 and 8 therebetween. The lever 35 rotates around a pivot pin 37 which projects from bottom wall 36 of the casing 32, and the outer end of the lever 36 projects out of the casing 32 through a horizontally elongated opening 38 formed in the side wall of the casing 32 and constitutes a grip 39. A spring 40 extends around the pivot pin 37 and between one of the walls 33 and the lever 35 to bias the lever 35 in its fully closed position as shown in FIG. 7.

Now operation of the closed containers having aforementioned pinch valves will now be explained.

The pinch valve A shown in FIGS. 1–4 normally closes the resilient tubes 7 and 8 as shown in FIGS. 1 and 2. The movable member 12 is urged leftward in the drawing by the spring 21 so that the resilient tubes 7 and 8 are fully squeezed between pressing elements 19 and 20 and supporting elements 15 and 18 respectively so as to close liquid and air passages. The container 1 is sealed from the outside, and air will not ingress into the container.

Figure 3:
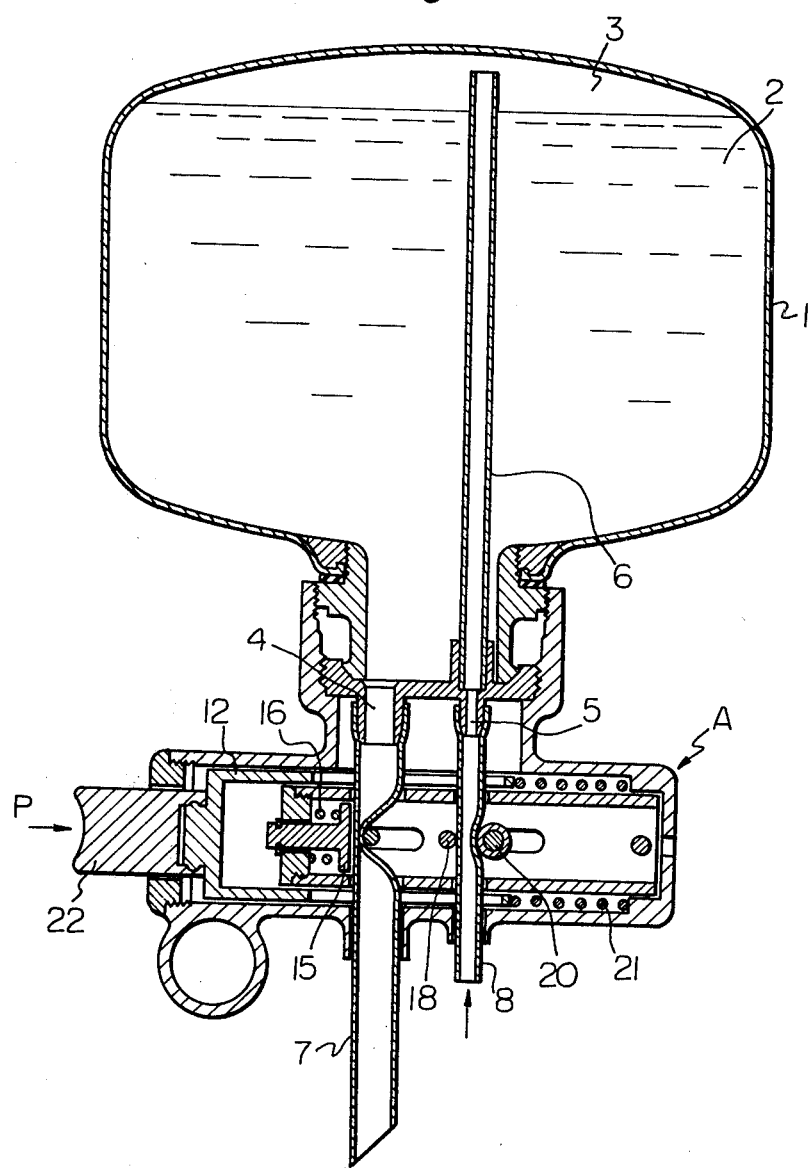
FIG. 3 is a view similar to FIG. 1 but showing the pinch valve in partially opened condition.
Figure 4:
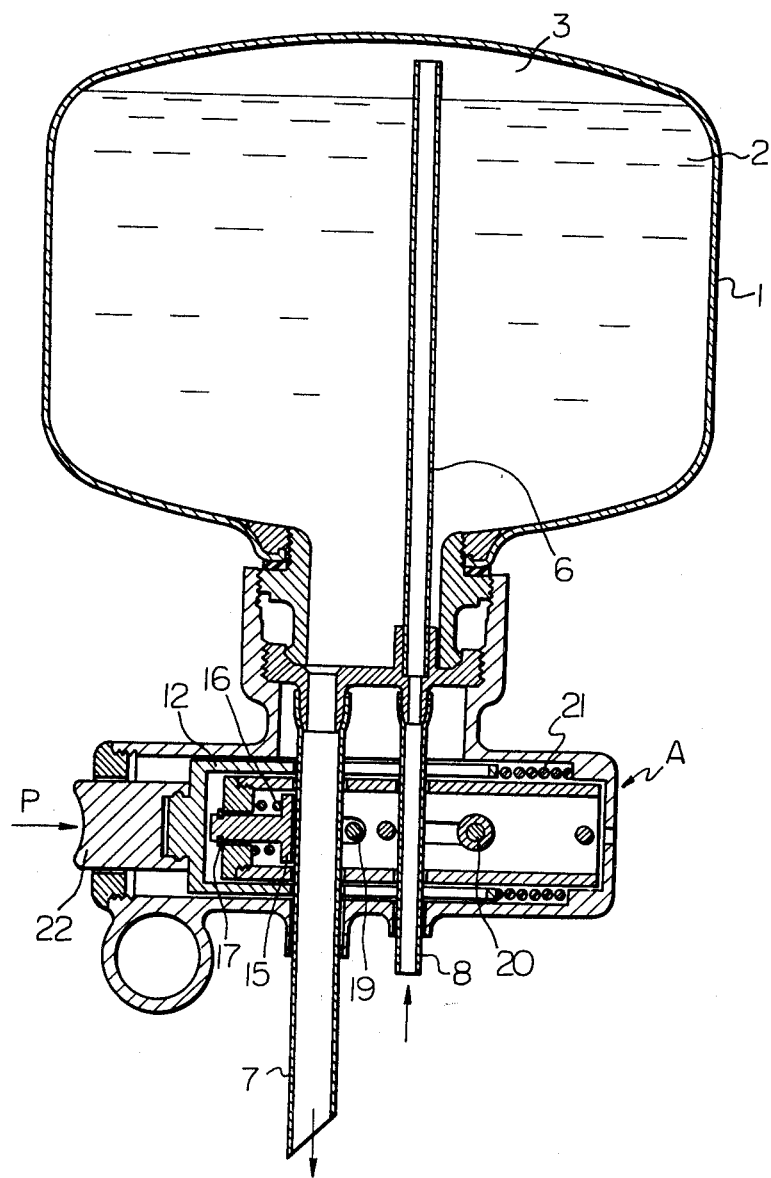
FIG. 4 is a view similar to FIG. 1 but showing the pinch valve in fully opened condition.

In opening the pinch valve A the operating knob 22 is pushed in arrow P direction in FIGS. 3 and 4. When the operating knob 22 is pushed against the force of the spring 21 by a small amount from the condition of FIGS. 1 and 2, the movable member 12 moves rightward accompanying the pressing elements 19 and 20, the resilient tube 8 which has been squeezed between the element 20 and the supporting element 18 will firstly open as shown in FIG. 3, but the resilient tube 7 is maintained in the closed condition since the supporting element 15 will move rightward according to the spring 16. It will be noted that the spring 16 is weaker than the spring 21 but it is sufficient to urge the supporting element 15 against the pressing element 19 to squeeze the resilient tube 7 therebetween.

When the operating knob 22 is further pressed in the rightward direction, the pressing elements 19 and 20 move rightward accordingly so that, firstly, the resilient tube 8 opens fully and, the resilient tube 7 opens gradually since movement of the supporting element 15 in the rightward direction caused by the spring 16 and maintaining the tube 7 in the closed condition is restricted by engagement of the snap ring 17 and the tube 7 takes the fully opened condition in FIG. 4.

When the operating knob 22 is released, the movable member 12 moves leftward by the force of the spring 21 and, firstly, the tube 7 is closed fully and, thereafter tube 8 is closed.

Thus, it is possible to firstly open the resilient tube 8 and, then, to open the resilient tube 7 to discharge liquid 2 in the container 1 by simply pushing the operating knob 22 of the pinch valve A. The discharge of liquid 2 can simply be stopped by releasing the knob 22, namely, as described heretofore, the resilient tube 7 closes first and, thereafter, the resilient tube 8 also closes so that the container 1 is reliably sealed and no air will ingress into the container 1.

The pinch valve B is shown in the fully closed condition in FIG. 5, wherein resilient tubes 7 and 8 are fully squeezed or closed to seal the container 1 from the outside. When the shaft 24 is rotated in the clockwise direction, the rollers 27 and 28 mounted on respective arms 25 and 26 retract from the resilient tubes, and the tubes 7 and 8 fully open in the condition shown in FIG. 6. The liquid 2 in the container 1 discharges to the outside through the resilient tube 7 and, atmospheric air will ingress into the upper space 3 of the container 1 through the resilient tube 8.

When the shaft 24 is rotated in the counterclockwise direction from the fully opened condition of FIG. 6, the rollers 27 and 28 mounted on the arms 25 and 26 squeeze respectively the resilient tubes 7 and 8 against inner walls 23a and 23b of the casing 23, whereby passage in the tubes 7 and 8 are fully closed.

Accordingly, it is possible to open or close the resilient tubes 7 and 8 simultaneously by simply rotating the shaft 24 in the pinch valve B.

In case of the pinch valve C shown in FIGS. 7 and 8, the resilient tubes 7 and 8 are fully squeezed in FIG. 7 to maintain the container 1 in the closed condition. By actuating the grip 39 to rotate the pressing lever 35 in the arrow X direction in FIG. 7 against the force of the spring 40, the squeezing force applied on the resilient tubes 7 and 8 is released to open passages therethrough. Thus liquid 2 in the container 1 flows out of the container 1 through the tube 7, and air flows into the upper space 3 of the container 1 through the resilient tube 8. Such condition is shown in FIG. 8. When the pressing lever 35 is rotated in the opposite direction from the fully opened condition of FIG. 8, the resilient tubes 7 and 8 are pressed against the walls 33 and 33 by pressing portions 34 and 34 of the lever 35, thus, fluid passages through resilient tubes 7 and 8 are simultaneously closed.

Accordingly, the pinch valve C is similar to the pinch valve B in simultaneously opening or closing the resilient tubes 7 and 8 by a simple rotating movement of the lever 35.

Figure 9:
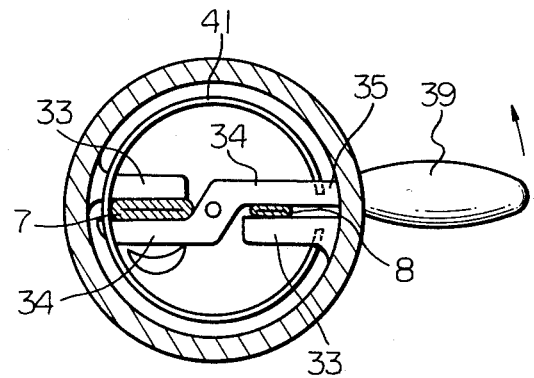
FIG. 9 is a view similar to FIG. 7 but showing a modified form in a slightly enlarged scale.

FIG. 9 shows a modification of FIG. 7 wherein the spring 40 in FIG. 7 is substituted by a circular spring 41 acting between one of walls 33 and the lever 35.

Figure 10:
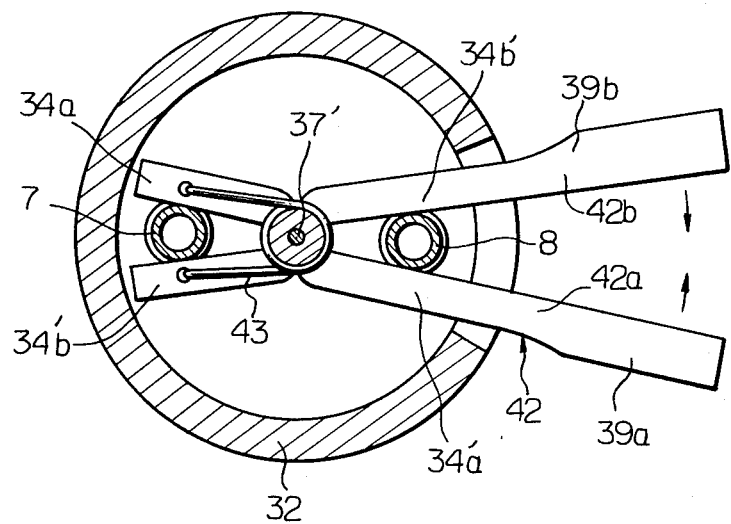
FIG. 10 is a view similar to FIG. 7 but showing a further modified form in a further enlarged scale.

FIG. 10 is a view showing a further modified form of the pinch valve C of FIGS. 7 and 8. In the drawing a scissors or pinchers like clamping member 42 is pivotally mounted on a pivot pin 37' which is similar to the pivot pin 37 of FIGS. 7–8. The clamping member 42 consists of a pair of elements 42a and 42b which have respectively clamping portions 34a, 34a' and 34b, 34b' and grip portions 39a and 39b respectively, the elements 42a and 42b are normally held in fully closed condition or fully opened condition (FIG. 10) by a spring 43. When the elements 42a and 42b are normally held in the fully opened condition it is possible to clamp the resilient tubes 7 and 8 between the clamping portions 34a and 34b and between the clamping portions 34a' and 34b' respectively by moving the grip portions 39a and 39b toward one another or in the arrow directions.

When the spring 43 is formed to normally hold the elements 42a and 42b in fully closed condition, it is preferable to deform the grip portions 39a and 39b to extend crossingly or X-shaped form so that the resilient tubes 7 and 8 can be opened by moving the grip portions 39a and 39b toward one another. The pivot pin 37' may be changed to the inner end portions of the elements 42a and 42b.

Figure 11:
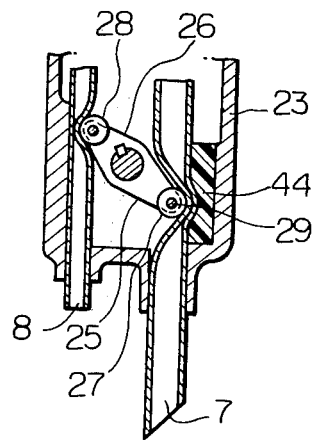
FIG. 11 is a sectional view showing a pinch valve modified from the pinch valve of FIG. 5.

The pinch valves B and C shown in FIGS. 5–10 are shown to open or close the resilient tubes 7 and 8 generally simultaneously, but they can be modified to open or close the resilient tubes at different timing similar to the pinch valve A. FIG. 11 shows a modification of the pinch valve B of FIG. 5, wherein a resilient member 44 is mounted in the inner wall of the casing 23 and the roller 27 acts to deform the resilient member 44 interposing the resilient tube 7 therebetween in fully closed condition of FIG. 11, whereby, it is possible to open the tube 8 prior to the resilient tube 7 in opening the pinch valve and, in closing the valve, the resilient tube 7 is closed firstly and thereafter the tube 8 closes. Similar effects can be obtained by providing the arm 25 being resiliently deformable with respect to the arm 26, or by providing the supporting shaft 29 of the roller 27 resiliently projecting in radially outward direction.

It is possible to provide a resilient member similar to the resilient member 44 of FIG. 11 in the embodiments of FIGS. 7 and 8, 9 and 10 in connection with walls 33, pressing portions 34, 34a, . . . In these embodiments, such resilient member 44 can act to diametrically equalize the pressing force acting on the resilient tubes 7 and 8, thus, such resilient member can also be provided with respect to the resilient tube 8 as well as the resilient tube 7. It is possible to suitably determine the opening or closing timing by changing thickness and/or resiliency of resilient member 44, and/or by changing the radial distance of the resilient tubes 7 and 8 from the pivot pin 37.

As described heretofore, according to the present invention, it is possible to open or close the air inlet port of the closed container in association with actuation or opening or closing operation of the liquid discharge port, thus, operation of the valve is simplified, and the quality of the liquid contained in the container will not be deteriorated.

The closed container according to the invention is particularly advantageous for use as a sub-dividing container of a relatively small quantity of draft beer.

Conventional small quantity containers of beer are formed of metal such as aluminium alloy or stainless steel, plastics or glass with the quantity of several liters. A normally closed pinch valve is secured to a relatively small mouth portion of the container and, thereafter, the container is supported upside down. In the closed container filled with beer, carbonic acid gas separated from the beer fills the internal space. Thus, when the discharge port and the vent port or air inlet port of the pinch valve open simultaneously as is usual in prior art device, beer will powerfully discharge out of the container according to gas pressure enclosed therein, thus, many bubbles are formed in the discharged beer and taste thereof is deteriorated. According to the invention and, particularly, by utilizing the pinch valve of the type wherein air inlet tube 8 opens first, it is possible to open the air inlet tube 8 prior to the opening of the liquid discharge tube 7, thus pressure gas in the container is released to atmosphere through the air inlet tube, and the discharge tube 7 opens with the internal pressure of the container being equal to atmospheric pressure, whereby beer discharges out of the container at the natural flow and generation of excessive bubbles can be prevented. In releasing and/or operating the lever or knob, the liquid discharge tube closes first and, thereafter the air inlet tube closes. Beer in the container is normally sealed from the outside air and, can easily be dispensed as required by a single operation.

It will be noted that the present invention can also be applied to a container containing therein volatile liquid such as perfume or the like.

The pinch valve described as heretofore is usually delivered to user separately from the container containing liquid therein and having a suitable plug attached to the mouth portion thereof to sealingly close the container. The plug is removed and the pinch valve is sealingly mounted on the mouth portion of the container with the air communicating tube 6 being inserted into the container. Thereafter, the container is placed upside down so that the container takes the position as shown in such as FIG. 1. Liquid contained in the container can be dispensed as desired.

Although preferred embodiments of this invention have been described, many variations and modifications will now be apparent to those skilled in the art. It is preferred, therefore, that the invention be limited not by the specific disclosure herein, but only by the appended claims.

We claim:

1. Device for use with a closed container for dispensing beer contained in said closed container, comprising a resilient discharge tube connected to the lower portion of said closed container for discharging beer contained therein outwardly therefrom, a resilient air inlet tube provided at the lower portion of said closed container adjacent to said resilient discharge tube, an air communicating tube in communication with said resilient inlet tube and also communicating said inlet tube with the space within said container above the level of the beer therein, and a pinch valve means arranged at the lower portion of said container for opening and closing both said resilient discharge and inlet tubes in coupled relationship with each other;

wherein the pinch valve comprises a casing, a stationary cylindrical member secured to the casing, a movable cylindrical member slidably fitted on the stationary cylindrical member, said resilient tubes passing transversely through said cylindrical members, supporting elements being mounted on the stationary member for supporting respectively one of the side surfaces of respective resilient tubes, and pressing elements being mounted on the movable member for pressing respectively the other of the side surfaces of respective tubes against said supporting elements respectively whereby the distances between supporting elements and pressing elements are changed to close or open the resilient tubes by actuating the movable member.

2. A closed container as set forth in claim 1 wherein the container contains beer.

3. A closed container as set forth in claim 1, wherein the container contains volatile liquid.

4. Device according to claim 1, wherein said pinch valve means is constructed so as to provide a time difference between the opening and closing time of said discharge tube and the opening and closing time of said inlet tube.

5. The closed container of claim 1 including spring means between said casing and said movable cylindrical members for biasing said pressing elements against said resilient tubes.

* * * * *